United States Patent

Suga et al.

[11] Patent Number: 5,990,038
[45] Date of Patent: Nov. 23, 1999

[54] CATALYST FOR PURIFYING OXYGEN RICH EXHAUST GAS

[75] Inventors: Katsuo Suga; Toru Sekiba, both of Yokohama, Japan

[73] Assignee: Nissan Motor Co., Ltd., Kanagawa, Japan

[21] Appl. No.: 09/027,811

[22] Filed: Feb. 23, 1998

[30] Foreign Application Priority Data

Feb. 24, 1997 [JP] Japan ................................. 9-038653

[51] Int. Cl.$^6$ ............... B01J 23/00; B01J 23/02; B01J 23/42; B01J 23/56
[52] U.S. Cl. ............... 502/303; 502/324; 502/325; 502/328; 502/332; 502/333; 502/334; 502/335; 502/336; 502/337; 502/338; 502/339; 502/340; 502/341; 502/327; 502/355
[58] Field of Search ............... 502/303, 325, 502/328, 324, 332, 333, 334–339, 340, 341, 327, 355, 525

[56] References Cited

U.S. PATENT DOCUMENTS

| | | | |
|---|---|---|---|
| 4,748,143 | 5/1988 | Tabata et al. | 502/304 |
| 4,849,398 | 7/1989 | Takada et al. | 502/303 |
| 5,447,705 | 9/1995 | Petit et al. | 423/418.2 |
| 5,559,073 | 9/1996 | Hu et al. | 502/525 |
| 5,622,680 | 4/1997 | Monceaux et al. | 423/213.5 |
| 5,691,263 | 11/1997 | Park et al. | 502/525 |
| 5,736,482 | 4/1998 | Durand et al. | 502/303 |
| 5,801,114 | 9/1998 | Durand et al. | 502/303 |
| 5,811,364 | 9/1998 | Suga et al. | 502/328 |
| 5,814,576 | 9/1998 | Yamamoto | 502/303 |
| 5,821,185 | 10/1998 | White et al. | 502/303 |

FOREIGN PATENT DOCUMENTS

| | | |
|---|---|---|
| 0 488 250 A1 | 6/1992 | European Pat. Off. . |
| 0 532 024 A1 | 3/1993 | European Pat. Off. . |
| 5-168860 | 7/1993 | Japan . |
| 5-89393A2 | 9/1993 | Japan . |
| 6-315634 | 11/1994 | Japan . |
| 7-136518 | 5/1995 | Japan . |
| 8-217461 | 8/1996 | Japan . |
| 9-86928 | 3/1997 | Japan . |

*Primary Examiner*—Mark L. Bell
*Assistant Examiner*—Patricia L. Hailey
*Attorney, Agent, or Firm*—McDermott, Will & Emery

[57] ABSTRACT

The invention relates to a first catalyst for purifying an exhaust gas. The first catalyst has a substrate and a catalytic coating formed thereon. This catalytic coating has first and second grains. The first grain includes a porous carrier supporting thereon at least one of palladium and rhodium. The second grain includes a double oxide supporting thereon at least one of platinum and palladium. This double oxide is represented by a formula of $(La_{1-x}A_x)_{1-\alpha}BO_\delta$ where A is at least one element selected from barium, potassium and cesium, B is at least one of iron, cobalt, nickel and manganese, $0<X<1$, $0<\alpha<0.2$, and $\delta$ is a number such that a net electric charge of the first double oxide becomes zero. The invention further relates to a second catalyst similar to the first catalyst. The first grain of the second catalyst includes a porous carrier supporting thereon at least one of platinum, palladium, rhodium and iridium. The second grain of the second catalyst includes a double oxide represented by a formula of $(La_{1-x}A_x)_{1-\alpha}BZr_\beta O_\delta$ where A, B, x, $\alpha$ and $\delta$ are defined as above and $0<\beta<1$. The first and second catalysts are each improved in NOx absorption capability and capable of purifying NOx contained in an oxygen rich exhaust gas, even after the passage of an exhaust gas of high temperature for a long time through these catalysts.

29 Claims, 1 Drawing Sheet 5,990,038

1

CATALYST FOR PURIFYING OXYGEN RICH EXHAUST GAS

The contents of Japanese Patent Application Nos. 9-38653, with a filing date of Feb. 24, 1997, are hereby incorporated by reference.

BACKGROUND OF THE INVENTION

The present invention relates to a catalyst for purifying hydrocarbons (HC), carbon monoxide (CO) and nitrogen oxides (NOx), which are contained in the exhaust gas from the internal-combustion engine of automobiles (of gasoline-type and of diesel-type) and boilers. The present invention relates in particular to a catalyst which is capable of purifying an oxygen rich exhaust gas by removing NOx contained in the oxygen rich exhaust gas.

In recent years, there has been a large demand for low-fuel-consumption automobiles, in view of the possibility of exhaustion of the petroleum resources and the global warming problems. In particular, there is a strong demand for lean-burn automobiles in the field of gasoline-engine automobiles. Such a lean-burn automobile is driven on the lean side with a large air-fuel ratio (A/F) as much as possible during an ordinary driving, so as to burn an oxygen rich air-fuel mixture and thereby meet with the demands for lower fuel consumption. In case of an oxygen rich (lean) air-fuel mixture, the oxygen content of an exhaust gas after combustion becomes high. If this exhaust gas is allowed to flow through a conventional three-way catalyst, the oxidation action becomes more active and the reduction action becomes inactive. In view of this, it has been desired to provide a catalyst which can sufficiently remove NOx by reducing NOx to $N_2$ even on the lean side, that is, in an oxygen rich exhaust gas. For example, Japanese Patent Unexamined Publication JP-A-5-168860 discloses a catalyst having a porous carrier supporting thereon platinum and lanthanum. In more detail, this publication discloses a catalyst having a porous carrier (e.g., alumina) covered with lanthanum oxide, and platinum of the catalyst is supported on this lanthanum oxide. It is supposed in this publication that on the lean side (A/F=23) NOx is partly adsorbed on the lanthanum oxide of this catalyst and that under a condition with near the stoichiometric air-fuel ratio NOx which has been adsorbed thereon moves onto Pt (i.e., reverse spill over) and then is reduced to $N_2$ by a reducing gas (CO, $H_2$ and HC). European Patent Application 0589393A2 discloses a method for purifying an oxygen rich exhaust gas by using a catalyst comprised of (i) at least one noble metal selected from platinum and palladium (ii) barium, and (iii) at least one metal selected from alkali metals, iron, nickel, cobalt and magnesium. These components (i), (ii) and (iii) of this catalyst are supported on a carrier composed of a porous substance. JP-A-9-86928 discloses an A-site-deficient perovskite double oxide and a catalyst prepared by using this double oxide. This double oxide is represented by a general formula of $A_{1-\alpha}BO_{3-\delta}$ where A is at least one selected from the group consisting of alkali metal elements, alkali earth elements, rare earth elements, Y, Bi and Pb, B is a 3d transition metal element and/or Al, $\alpha$ is greater than 0 and less than 0.2, and $\delta$ is from 0 to 1.

SUMMARY OF THE INVENTION

It is an object of the present invention to provide a catalyst for purifying an exhaust gas, which is improved in NOx absorption capability and capable of purifying NOx contained in an oxygen rich exhaust gas, even after the passage of an exhaust gas of high temperature for a long time through the catalyst.

It is another object of the present invention to provide a method of producing such a catalyst.

According to a first aspect of the present invention, there is provided a catalyst for purifying an exhaust gas. This catalyst (hereinafter referred to as "catalyst 1", too) has a substrate and a catalytic coating formed thereon. This catalytic coating comprises first and second grains. The first grain includes a porous carrier which supports thereon at least one first noble metal selected from the group consisting of palladium and rhodium. The second grain includes a first double oxide which supports thereon at least one second noble metal selected from the group consisting of platinum and palladium. The first double oxide is represented by the following general formula (1):

$$(La_{1-x}A_x)_{1-\alpha}BO_\delta \quad (1)$$

where A is at least one element selected from the group consisting of barium, potassium and cesium, B is at least one transition element selected from the group consisting of iron, cobalt, nickel and manganese, x is a number which is greater than 0 and less than 1, $\alpha$ is a number which is greater than 0 and less than 0.2, and $\delta$ is a number such that a net electric charge of the first double oxide becomes zero.

According to a second aspect of the present invention, there is provided a catalyst for purifying an exhaust gas. This catalyst (hereinafter referred to as "catalyst 2", too) also has a substrate and a catalytic coating formed thereon. This catalytic coating comprises first and second grains. The first grain includes a porous carrier which supports thereon at least one first noble metal selected from the group consisting of platinum, palladium, rhodium and iridium. The second grain includes a first double oxide represented by the following general formula (2):

$$(La_{1-x}A_x)_{1-\alpha}BZr_\beta O_\delta \quad (2)$$

where A, B, x, $\alpha$, and $\delta$ are defined as in the general formula (1), and $\beta$ is a number which is greater than 0 and less than 3.

According to the first aspect of the present invention, there is further provided a method of producing the catalyst 1. This method comprises the following steps of: (a) preparing a mixture comprising a first powder including the porous carrier which supports thereon the at least one first noble metal; and a second powder including the first double oxide which supports thereon the at least one second noble metal; (b) preparing a slurry by adding water to the mixture; (c) applying the slurry to the substrate, such that a precursor of the catalytic coating is formed on the substrate; and (d) baking the precursor into the catalytic coating.

According to the second aspect of the present invention, there is further provided a method of producing the catalyst 2. This method comprises the same steps as above, except in that there is prepared in the step (a) a mixture comprising a first powder including the porous carrier which supports thereon the at least one first noble metal of the second aspect of the present invention, and a second powder including the first double oxide of the second aspect of the present invention.

In general, the passage of an exhaust gas of high temperature for a long time through conventional catalysts (e.g., the above-mentioned catalyst of JP-A-5-168860) tends to make these catalysts inferior in NOx absorption or adsorption capability. Once such a catalyst becomes inferior in NOx absorption capability, an engine with this catalyst can not be driven on the lean side for a long time due to insufficient NOx absorption capability. If this engine is so driven, harmful NOx is directly exhausted to the atmosphere. In contrast, the above-mentioned catalysts 1 and 2 according to the present invention are each improved in NOx absorption capability and capable of purifying NOx contained in an oxygen rich exhaust gas, even after the passage of an exhaust gas of high temperature for a long time through the catalyst. Therefore, an engine with such a catalyst can be driven on the lean side for a long time.

DESCRIPTION OF THE PREFERRED EMBODIMENTS

Figure 1:
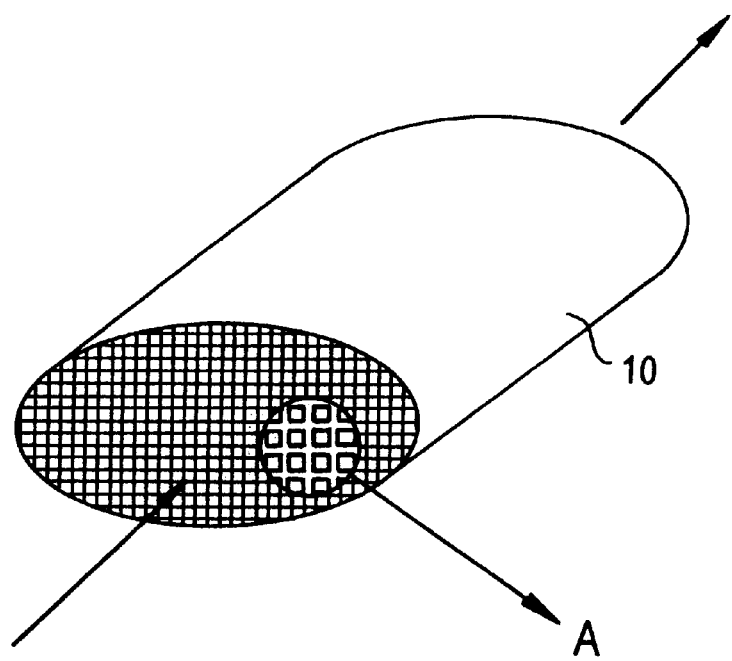
FIG. 1 is a perspective view showing a catalyst according to the present invention.

As stated above, the catalyst 1 according to the first aspect of the invention is improved in NOx absorption capability, even after the passage of an exhaust gas of high temperature for a long time through the catalyst 1. According to the first aspect of the invention, the first double oxide supports thereon the at least one second noble metal (i.e., Pt and/or Pd). Thus, the first double oxide and the at least one second noble metal are in a close contact with each other. Therefore, it is assumed that the catalyst 1 is improved in NOx absorption capability due to the interaction of the first double oxide and the at least one second noble metal.

In contrast to the invention, if the first double oxide of the catalyst 1 does not support thereon the at least one second noble metal, this first double oxide alone will be lowered to about 0.5–5 m$^2$/g in specific surface area, after baking of this first double oxide in an atmosphere of 1,000° C. With this, this first double oxide will not be characterized as being a porous body and will become low in NOx absorption capability. In contrast, according to the invention, the first double oxide of the catalyst 1 supports thereon the at least one second noble metal, as mentioned above. With this, the catalyst 1 becomes unexpectedly superior in NOx absorption capability on the lean side, even after the passage of an exhaust gas of high temperature for a long time through the catalyst 1. It is assumed on the lean side that NO contained in an exhaust gas is oxidized on the first double oxide of the invention to a NOx (i.e., NO$_2$ and/or NO$_3$), and then this NOx is absorbed into or adsorbed onto the first double oxide. In contrast to the invention, if the first double oxide does not support thereon the at least one second noble metal, this oxidation of NO does not proceed smoothly due to the above-mentioned thermal deterioration of the first double oxide alone. According to the present invention, however, it is assumed that this oxidation proceeds smoothly due to the interaction between the first double oxide and the at least one second noble metal.

As stated above, the first double oxide of the catalyst 1 has the above general formula (1). In other words, this first double oxide has an A-site-deficient perovskite structure. With this, a solid phase reaction of the first double oxide with another component (e.g., alumina) contained in the catalyst 1 is advantageously prevented. This structure also contributes toward making the catalyst 1 superior in NOx absorption capability, even after the passage of an exhaust gas of high temperature for a long time through the catalyst 1.

According to the first aspect of the present invention, when the engine is driven on the lean side, NOx contained in the exhaust gas is absorbed into or adsorbed on the first double oxide. When the engine is driven under a condition with near the stoichiometric condition, the adsorbed NOx is released from the first double oxide and then sufficiently purified by the at least one first noble metal (i.e., Pd and/or Rh) supported on the porous carrier.

According to the first aspect of the present invention, the first double oxide of the catalyst 1 may further contain zirconium. With this, both of the first double oxide and the at least one second noble metal supported thereon are improved in heat resistance. With this, the catalyst 1 is further improved in NOx absorption capability.

As stated above, the catalyst 2 according to the second aspect of the invention contains the first double oxide having the above general formula (2). It is assumed that this contributes toward preventing the reduction of the first double oxide in specific surface area, even after the passage of an exhaust gas of high temperature for a long time through the catalyst 2 and thus that the catalyst 2 is improved in NOx absorption capability.

As stated above, the catalyst 2 contains the at least one first noble metal (i.e., Pt, Pd, Rh and/or Ir). This noble metal is capable of purifying an exhaust gas from an engine under a condition with near the stoichiometric condition. Furthermore, the catalyst 2 is also improved in NOx absorption capability due to the coexistence of the at least one first noble metal with the first double oxide.

In the invention, the porous carrier may be made of at least one material selected from alumina, silica-alumina (i.e., a double oxide of silica and alumina) and zeolite. These materials are superior in heat resistance, and thus the at least one first noble metal supported on the porous carrier becomes superior in dispersibility thereon, even after the passage of an exhaust gas of high temperature for a long time through the catalyst. Therefore, NOx can sufficiently be purified under the stoichiometric condition, for example, by palladium and/or rhodium. It is particularly preferable to use activated alumina as the porous carrier. Furthermore, it is optional to add a rare earth element or zirconium to the porous carrier, for the purpose of increasing heat resistant specific surface area of the porous carrier. It is preferable to use the porous carrier in an amount of from 50 to 300 g per liter of the substrate.

According to the invention, the catalytic coating may have first and second catalytic layers. In this case, the first catalytic layer is formed on the substrate and contains the above-mentioned second grain of the first or second aspect of the invention, and the second catalytic layer is formed on the first layer and contains the above-mentioned first grain of the first or second aspect of the invention. With this catalytic coating, the catalyst becomes superior in NOx absorption capability on the lean side and in capability for purifying NOx which has been absorbed into the catalyst on the lean side and then released therefrom under the stoichiometric condition. The reason of this will be assumed, as follows. When the above two-layer catalytic coating is used, at first, an untreated exhaust gas containing a relatively large amount of hydrocarbons (HC) reaches the second layer, and then its HC are substantially purified by the second catalytic layer. Then, the resultant exhaust gas containing a relatively small amount of HC reaches the first layer. Then, a larger amount of NOx contained in this exhaust gas is absorbed into or adsorbed onto the first double oxide of the first layer, due to a relatively small amount of HC coexistent with NOx. In contrast to this, when an untreated exhaust gas is directly brought into contact with the first double oxide, a smaller amount of NOx is absorbed into the first double oxide, due to a relatively large amount of HC contained in the untreated exhaust gas. With the use of the two-layer catalytic coating, NOx is released from the first double oxide of the first layer under the stoichiometric condition, then reaches the second layer, and then is brought into contact on the second layer with another untreated exhaust gas containing a relatively large amount of HC (reducing gas). Therefore, this released NOx is efficiently purified.

In the invention, the catalytic coating may further contain a third grain including a second double oxide containing cerium and zirconium. With this, it becomes possible to suppress the sintering of the noble metals, which is caused by the passage of an exhaust gas of high temperature for a long time through the catalyst. Therefore, the catalyst becomes further improved in NOx absorption capability and in capability for purifying the released NOx. The second double oxide may support thereon at least one noble metal selected from platinum and palladium. With this, this at least one noble metal will not be deteriorated by the above-mentioned passage. Thus, the catalyst becomes further improved in capability as a three-way catalyst and in capability for purifying the released NOx.

In the invention, the catalyst may further contain a barium compound such as barium carbonate. With this, it becomes possible to suppress the deterioration of the noble metals. Thus, the catalyst becomes further improved in capability as a three-way catalyst and in capability for purifying the released NOx. A part of the barium carbonate may be replaced with barium hydroxide and/or barium oxide. In order to add a barium compound to the catalyst, it is optional to immerse the catalyst in a barium acetate aqueous solution, and then bake it at a temperature of from 300 to 500° C.

In the invention, the catalyst is intended to be used for purifying an exhaust gas from a lean-burn engine alternately having a so-called stoichiometric condition having an A/F ratio, for example, of from 10.0 to 14.7 and a lean condition having an A/F ratio, for example, of from 15.0 to 50.0. In other words, NOx is absorbed or adsorbed under the lean condition, and then this NOx is released and purified under the subsequent stoichiometric condition.

In the invention, the substrate of the catalyst is not particularly limited and may be selected from conventional substrates. It is preferable to use a heat resistant monolithic (honeycomb) substrate made of a ceramic (e.g., cordierite) or metal material (e.g., ferrite-based stainless steel).

In the invention, the amount of the noble metal is not particularly limited, as long as the catalyst becomes satisfactory in NOx absorption capability and in capability as a three-way catalyst. Its amount is preferably in a range of from 0.1 to 10 g per liter of the substrate.

According to the first aspect of the invention, a part of the first double oxide represented by the above general formula (1) may be replaced, for example, with a mixture of lanthanum oxide, an oxide of element "A" and an oxide of element "B" where A and B are defined as in the general formula (1). According to the second aspect of the invention, a part of the first double oxide represented by the above general formula (2) may be replaced, for example, with a mixture of lanthanum oxide, an oxide of element "A", an oxide of element "B" and zirconium oxide where A and B are defined as above. The desired function of the first double oxide can be obtained in these cases with the above-mentioned partial replacement of the first double oxide, too. However, according to the invention, it is preferable not to conduct the above-mentioned partial replacement of the first double oxide, in order to maximize the function of the first double oxide. The existence of a double oxide can be confirmed by X-ray diffraction analysis. The first double oxide used in the invention may contain small amounts of impurities, as long as the impurities do not interfere with the function of the first double oxide. In fact, barium, lanthanum and zirconium of the first double oxide may respectively contain a small amount of strontium, a small amount of cerium, neodymium and/or samarium, and a small amount of hafnium.

In the invention, the method for producing the double oxide (i.e., each of the first and second double oxides) is not particular limited. For example, this method may comprise sequential steps of (a) preparing a mixture of solutions of salts (e.g., nitrate, carbonate, acetate, citrate and hydrochloride) of all the metals used for the double oxide; (b) optionally adding a precipitator (e.g., ammonia and ammonium carbonate) to the mixture, thereby to form a precipitate; (c) drying the mixture or the precipitate, followed by baking of the same, thereby to obtain the double oxide in the form of powder.

In the invention, a part of the second double oxide contained in the third grain may be replaced, for example, with a mixture of cerium oxide and zirconium oxide. The desired function of the second double oxide can be obtained in this case, too. However, according to the invention, it is preferable not to conduct the above-mentioned partial replacement of the second double oxide, in order to maximize the function of the second double oxide. The ratio of the number of cerium atoms to that of zirconium atoms in the second double oxide is preferably in a range of from 1:9 to 9:1. With this, it becomes possible to sufficiently suppress the heat deterioration of the noble metal. The existence of the second double oxide can also be confirmed by X-ray diffraction analysis. Similar to the first double oxide, the second double oxide may contain small amounts of impurities, as long as the impurities do not interfere with the function of the second double oxide. In fact, zirconium and cerium of the second double oxide may respectively contain a small amount of hafnium and a small amount of lanthanum, neodymium and/or samarium.

Figure 2:
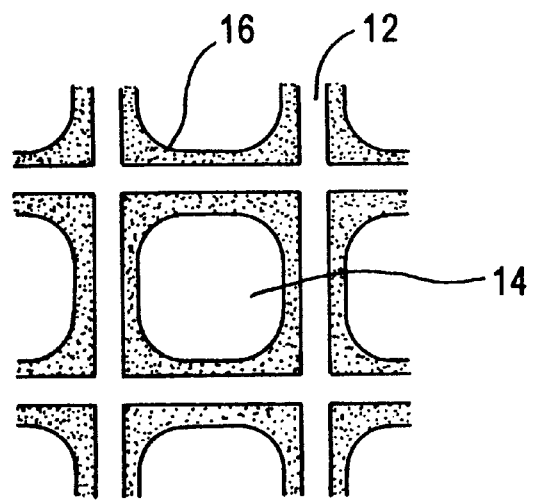
FIG. 2 is an enlarged view showing portion A of FIG. 1.

In the invention, the noble metal may be supported, for example, on the double oxide by at first mixing an aqueous solution of a noble metal salt with a precursory powder of the double oxide, then drying the mixture and then baking the mixture at a temperature of from 300 to 500° C. In the invention, the catalyst may be prepared by a method comprising the sequential steps of (a) mixing precursory powders; (b) adding water and an optional thickener (e.g., nitrated aluminum sol); (c) wet grinding the resultant mixture into a slurry; (d) applying the slurry to the substrate; and (e) baking the coated substrate to obtain the catalyst. As shown in FIGS. 1 and 2, the catalyst may have a monolithic honeycomb structure 10. This structure 10 has a substrate 12 defining a plurality of cells 14 each having therein a catalytic coating 16. An exhaust gas is allowed to flow through the structure 10 in the axial direction thereof, as shown by the arrow of FIG. 1, in order to purify the exhaust gas.

The following nonlimitative examples are illustrative of the present invention.

EXAMPLE 1

In this example, there was prepared a catalyst according to the first aspect of the present invention, as follows.

At first, a rhodium nitrate aqueous solution was added to an activated alumina powder. Then, this mixture was dried and then baked or calcined at 400° C. for 1 hr, thereby to prepare an activated alumina powder (powder A) supporting thereon rhodium, as the first powder. This powder A contained 2.0 wt % of rhodium. Separately, a palladium nitrate aqueous solution was added to an activated alumina powder. Then, this mixture was dried and then baked or calcined at 400° C. for 1 hr, thereby to prepare a palladium-supported activated alumina powder (powder B) as the first powder. This powder B contained 4.0 wt % of palladium. Separately, citric acid was added to a mixture of lanthanum carbonate, barium carbonate and cobalt carbonate. Then, the obtained mixture was dried and then baked at 700° C. to prepare a powder. This powder contained 4 parts by the number of atoms of La, 5 of Ba and 10 of Co. Then, a dinitrodiammineplatinum aqueous solution was added to this powder. Then, the obtained mixture was dried and then baked at 400° C. for 1 hr, thereby to prepare a platinum-supported powder (powder C) as the second powder. This powder C contained 4.0 wt % of platinum.

Then, a magnetic ball mill was charged with 106 g of powder A, 265 g of powder B, 212 g of powder C, 318 g of an activated alumina powder, and 900 g of water. Then, this ball mill was driven to mix and grind these components, thereby to obtain a slurry. Then, this slurry was applied to a cordierite monolithic (honeycomb) substrate having a volume of 1.0 liter and 400 cells. Then, an excessive amount of the slurry on the substrate was blown off by allowing air to flow through the cells. After that, the coated substrate was dried at 130° C. and then baked at 400° C. for 1 hr. Then, this operation from the slurry application to the baking of the catalyst was repeated one more time, thereby to obtain the catalyst having 150 g of the catalytic coating formed on the substrate per liter of the substrate. This catalyst had 1.41 g of Pt, 0.35 g of Rh and 1.77 g of Pd per liter of the substrate.

EXAMPLE 2

In this example, Example 1 was repeated except in that cobalt used for preparing powder C was replaced with iron.

EXAMPLE 3

In this example, Example 1 was repeated except in that cobalt used for preparing powder C was replaced with nickel.

EXAMPLE 4

In this example, Example 1 was repeated except in that cobalt used for preparing powder C was replaced with manganese.

COMPARATIVE EXAMPLE 1

In this example, Example 1 was repeated except in that lanthanum carbonate was omitted.

COMPARATIVE EXAMPLE 2

In this example, Example 1 was repeated except in that barium carbonate used for preparing powder C was omitted.

COMPARATIVE EXAMPLE 3

In this example, Example 1 was repeated except in that cobalt carbonate used for preparing powder C was omitted.

EXAMPLE 5

In this example, a two-layer catalytic coating according to the first aspect of the present invention was formed on a substrate which was the same as that of Example 1, as follows.

At first, a magnetic ball mill was charged with 424 g of powder C which was the same as that of Example 1, 476 g of an activated alumina powder and 900 g of water. Then, this ball mill was driven to mix and grind these components, thereby to obtain a first slurry. This first slurry was applied to the substrate. Then, an excessive amount of the first slurry on the substrate was blown off in the same manner as that of Example 1. Then, the coated substrate was dried and then baked in the same manner as that of Example 1, thereby to obtain 75 g of a first catalytic layer formed on the substrate per liter of the substrate.

Then, a magnetic ball mill was charged with 211 g of powder A and 529 g of powder B, which were respectively the same as those of Example 1, 160 g of an activated alumina powder, and 900 g of water. Then, this ball mill was driven to mix and grind these components, thereby to obtain a second slurry. This second slurry was applied to the first catalytic layer. Then, the removal of an excessive amount of the second slurry and the subsequent drying and baking were conducted in the same manners as those of Example 1, thereby to form a second catalytic layer on the first catalytic layer. The obtained catalyst had 150 g of a two-layer catalytic coating formed on the substrate per liter of the substrate.

EXAMPLE 6

In this example, Example 1 was repeated except in that powder B was replaced with the following powder D. This powder D was prepared as follows. At first, ammonia was added to an aqueous solution containing cerium nitrate and zirconium nitrate. Then, the obtained mixture was dried and then baked at 500° C. to prepare a powder. This powder contained 8 parts by the number of atoms of cerium and 2 of zirconium. Then, a palladium nitrate aqueous solution was added to the powder. Then, this mixture was dried and then baked at 400° C. for 1 hr, thereby to obtain a palladium-supported powder (powder D). This powder D contained 4.0 wt % of palladium.

EXAMPLE 7

In this example, the catalyst obtained in Example 1 was immersed in a barium acetate aqueous solution. Then, the catalyst was taken out of this solution, then dried at 120° C., and then baked at 400° C.

EXAMPLE 8

In this example, Example 1 was repeated except in that the dinitrodiammineplatinum aqueous solution used for preparing powder C of Example 1 was replaced with a palladium nitrate aqueous solution. The obtained powder C contained 4.0 wt % of palladium, and the obtained catalyst had 150 g of a catalytic coating formed on the substrate per liter of the substrate. This catalyst had 0.35 g of Rh and 3.18 g of Pd per liter of the substrate.

EXAMPLE 9

In this example, there was prepared a catalyst according to the second aspect of the present invention, as follows.

At first, a rhodium nitrate aqueous solution was added to an activated alumina powder. Then, this mixture was dried and then baked or calcined at 400° C. for 1 hr, thereby to prepare a rhodium-supported activated alumina powder (powder A) as the first powder. This powder A contained 2.0 wt % of rhodium and had a particle diameter of from 0.1 to 100 μm. Separately, a palladium nitrate aqueous solution was added to an activated alumina powder. Then, this mixture was dried and then baked at 400° C. for 1 hr, thereby to prepare a palladium-supported activated alumina powder (powder B) as the first powder. This powder B contained 4.0 wt % of palladium and had a particle diameter of from 0.1 to 100 μm. Separately, citric acid was added to a mixture of lanthanum carbonate, barium carbonate, cobalt carbonate and zirconium carbonate. Then, the obtained mixture was dried and then baked at 700° C., thereby to prepare a powder (powder C) having a particle diameter of from 0.1 to 100 μm, as the second powder. This powder C contained 2 parts by the number of atoms of La, 7 of Ba, 10 of Co and 10 of zirconium.

Then, a magnetic ball mill was charged with 159 g of powder A, 198 g of powder B, 198 g of powder C, 344 g of an activated alumina powder, and 900 g of water. Then, this ball mill was driven to mix and grind these components, thereby to obtain a slurry. Then, this slurry was applied to a cordierite monolithic (honeycomb) substrate having a volume of 1.0 liter and 400 cells. Then, an excessive amount of the slurry on the substrate was removed by allowing air to flow through the cells. After that, the coated substrate was dried at 130° C. and then baked at 400° C. for 1 hr. Then, this operation from the slurry application to the baking of the catalyst was repeated one more time, thereby to obtain the catalyst having 200 g of the catalytic coating formed on the substrate per liter of the substrate. This catalyst had 0.71 g of Rh and 1.76 g of Pd per liter of the substrate.

EXAMPLE 10

In this example, Example 9 was repeated except in that cobalt used for preparing powder C was replaced with iron.

EXAMPLE 11

In this example, Example 9 was repeated except in that cobalt used for preparing powder C was replaced with nickel.

EXAMPLE 12

In this example, Example 9 was repeated except in that cobalt used for preparing powder C was replaced with manganese.

EXAMPLE 13

In this example, Example 9 was repeated except in that barium used for preparing powder C was replaced with potassium.

COMPARATIVE EXAMPLE 4

In this example, Example 9 was repeated except in that lanthanum carbonate was omitted.

COMPARATIVE EXAMPLE 5

In this example, Example 9 was repeated except in that barium carbonate used for preparing powder C was omitted.

COMPARATIVE EXAMPLE 6

In this example, Example 9 was repeated except in that cobalt carbonate used for preparing powder C was omitted.

COMPARATIVE EXAMPLE 7

In this example, Example 9 was repeated except in that zirconium carbonate used for preparing powder C was omitted.

EXAMPLE 14

In this example, a two-layer catalytic coating according to the second aspect of the present invention was formed on a substrate which was the same as that of Example 9, as follows.

At first, a magnetic ball mill was charged with 397 g of powder C which was the same as that of Example 9, 503 g of an activated alumina powder and 900 g of water. Then, this ball mill was driven to mix and grind these components, thereby to obtain a first slurry. This first slurry was applied to the substrate. Then, an excessive amount of the first slurry on the substrate was removed in the same manner as that of Example 9. Then, the coated substrate was dried and then baked in the same manner as that of Example 9, thereby to obtain 100 g of a first catalytic layer formed on the substrate per liter of the substrate.

Then, a magnetic ball mill was charged with 318 g of powder A and 397 g of powder B, which were respectively the same as those of Example 9, 185 g of an activated alumina powder, and 900 g of water. Then, this ball mill was driven to mix and grind these components, thereby to obtain a second slurry. This second slurry was applied to the first catalytic layer. Then, the removal of an excessive amount of the second slurry and the subsequent drying and baking were conducted in the same manners as those of Example 9, thereby to form a second catalytic layer on the first catalytic layer. The obtained catalyst had 200 g of a two-layer catalytic coating formed on the substrate per liter of the substrate.

EXAMPLE 15

In this example, Example 9 was repeated except in that powder B was replaced with powder D of Example 6.

EXAMPLE 16

In this example, the catalyst obtained in accordance with Example 9 was immersed in a barium acetate aqueous solution. Then, the catalyst was taken out of this solution, then dried at 120° C., and then baked at 400° C.

EXAMPLE 17

In this example, Example 9 was repeated except in that the palladium nitrate aqueous solution used for preparing powder B was replaced with a dinitrodiammineplatinum aqueous solution. The catalyst had 1.76 g of Pt and 0.71 g of Rh per liter of the substrate.

EXAMPLE 18

In this example, Example 9 was slightly modified as follows. At first, an iridium chloride aqueous solution was added to an activated alumina powder. Then, the obtained mixture was dried and then baked at 400° C. for 1 hr, thereby to obtain an iridium-supported alumina powder (powder E). This powder E contained 2.0 wt % of iridium.

Then, a magnetic ball mill was charged with 159 g of powder A, 198 g of powder B and 198 g of powder C, which were respectively the same as those of Example 9, 159 g of powder E, 186 g of activated alumina powder, and 900 g of water. Then, this ball mill was driven to mix and grind these components, thereby to obtain a slurry. This slurry was applied to the substrate. Then, an excessive amount of the slurry on the substrate was removed in the same manner as that of Example 9. Then, the coated substrate was dried and then baked in the same manner as that of Example 9, thereby to obtain the catalyst having 200 g of a catalytic coating formed on the substrate per liter of the substrate. This catalyst had 0.71 g of Rh, 1.76 g of Pd and 0.71 g of Ir per liter of the substrate.

EXAMPLE 19

In this example, Example 18 was repeated except in that the palladium nitrate aqueous solution used for preparing powder B was replaced with a dinitrodiammineplatinum aqueous solution. The catalyst had 1.76 g of Pt, 0.71 g of Rh and 0.71 g of Ir per liter of the substrate.

Evaluation Tests

At first, the catalysts of Examples 1–19 and Comparative Examples 1–7 were each subjected to a durability test. In this test, each catalyst was installed in the exhaust system of an engine having a displacement of 4,400 cubic centimeters (cc). Then, this engine was driven for 50 hr by maintaining the temperature of the inlet of each catalyst at 750° C.

Before and after the durability test, the catalysts of Examples 1–8 and Comparative Examples 1–3 were each subjected to a first evaluation test. In this test, each catalyst was installed in the exhaust system of an engine having a displacement of 2,000 cc. Then, this engine was driven at first in a first mode for 60 seconds with an air-fuel ratio of 14.6, then in a second mode for 60 seconds with an air-fuel ratio of 22, and then in a third mode for 60 seconds with an air-fuel ratio of 40, while the temperature of the inlet of each catalyst was maintained at 300° C. The total conversion from the first to third mode of each of HC, CO and NOx was determined, and the results are shown in Table. In Table, the total conversion before the durability test is named the initial conversion.

Before and after the durability test, the catalysts of Examples 9–19 and Comparative Examples 4–7 were each subjected to a second evaluation test. In this test, each catalyst was installed in the exhaust system of an engine having a displacement of 2,000 cc. Then, this engine was driven at first in a first mode for 60 seconds with an air-fuel ratio of 14.6, and then in a second mode for 60 seconds with an air-fuel ratio of 22, while the temperature of the inlet of each catalyst was maintained at 300° C. The total conversion from the first to second mode of each of HC, CO and NOx was determined, and the results are shown in Table.

TABLE

|  | Initial Conversion (%) | | | Conversion after Durability Test (%) | | |
| --- | --- | --- | --- | --- | --- | --- |
|  | HC | CO | NOx | HC | CO | NOx |
| Ex. 1 | 94 | 100 | 77 | 90 | 99 | 64 |
| Ex. 2 | 93 | 100 | 75 | 89 | 98 | 63 |
| Ex. 3 | 94 | 100 | 75 | 92 | 99 | 60 |
| Ex. 4 | 95 | 100 | 78 | 91 | 99 | 63 |
| Com. Ex. 1 | 95 | 100 | 70 | 90 | 99 | 56 |
| Com. Ex. 2 | 96 | 100 | 55 | 91 | 99 | 52 |
| Com. Ex. 3 | 95 | 100 | 56 | 95 | 98 | 52 |
| Ex. 5 | 91 | 100 | 80 | 99 | 98 | 68 |
| Ex. 6 | 93 | 100 | 84 | 95 | 96 | 64 |
| Ex. 7 | 92 | 100 | 82 | 96 | 100 | 65 |
| Ex. 8 | 96 | 100 | 87 | 95 | 99 | 72 |
| Ex. 9 | 96 | 100 | 85 | 94 | 99 | 75 |
| Ex. 10 | 96 | 100 | 84 | 93 | 99 | 73 |
| Ex. 11 | 96 | 100 | 84 | 94 | 99 | 73 |
| Ex. 12 | 95 | 100 | 82 | 95 | 99 | 73 |
| Ex. 13 | 93 | 100 | 85 | 93 | 99 | 74 |
| Com. Ex. 4 | 95 | 100 | 75 | 92 | 99 | 62 |

TABLE-continued

|  | Initial Conversion (%) | | | Conversion after Durability Test (%) | | |
| --- | --- | --- | --- | --- | --- | --- |
|  | HC | CO | NOx | HC | CO | NOx |
| Com. Ex. 5 | 96 | 100 | 65 | 94 | 99 | 59 |
| Com. Ex. 6 | 95 | 100 | 60 | 95 | 98 | 58 |
| Com. Ex. 7 | 95 | 100 | 76 | 95 | 98 | 64 |
| Ex. 14 | 94 | 100 | 88 | 95 | 96 | 74 |
| Ex. 15 | 95 | 100 | 84 | 94 | 99 | 74 |
| Ex. 16 | 95 | 100 | 88 | 92 | 100 | 75 |
| Ex. 17 | 95 | 100 | 85 | 94 | 99 | 70 |
| Ex. 18 | 94 | 100 | 87 | 93 | 100 | 77 |
| Ex. 19 | 95 | 100 | 84 | 94 | 99 | 75 |

What is claimed is:

1. A catalyst for purifying an exhaust gas, said catalyst comprising:
    a substrate; and
    a catalytic coating formed on said substrate, said catalytic coating comprising:
        a first grain including a porous carrier which supports thereon at least one first noble metal selected from the group consisting of palladium and rhodium; and
        a second grain including a first double oxide which supports thereon at least one second noble metal selected from the group consisting of platinum and palladium, said first double oxide being represented by the following general formula (1);

$$(La_{1-x}A_x)_{1-\alpha}BO_\delta \quad (1)$$

where A is at least one element selected from the group consisting of barium, potassium and cesium, B is at least one transition element selected from the group consisting of iron, cobalt, nickel and manganese, x is a number which is greater than 0 and less than 1, $\alpha$ is a number which is greater than 0 and less than 0.2, and $\delta$ is a number which is greater than zero, wherein said first double oxide further comprises zirconium.

2. A catalyst according to claim 1, wherein said porous carrier is made of at least one member selected from the group consisting of alumina, a silica-alumina and zeolite.

3. A catalyst according to claim 1, wherein said catalytic coating comprises:
    a first layer which is formed on the substrate and contains said second grain; and
    a second layer which is formed on said first layer and contains said first grain.

4. A catalyst according to claim 1, wherein said catalytic coating further comprises a third grain including a second double oxide containing cerium and zirconium.

5. A catalyst according to claim 4, wherein said second double oxide supports thereon at least one third noble metal selected from the group consisting of platinum and palladium.

6. A catalyst according to claim 5, wherein said at least one third noble metal is said palladium.

7. A catalyst according to claim 1, wherein said catalytic coating further comprises a barium compound.

8. A catalyst according to claim 7, wherein said barium compound is barium carbonate.

9. A catalyst according to claim 1, wherein said porous carrier is in an amount of from 50 to 300 g per liter of said substrate.

10. A catalyst for purifying an exhaust gas, said catalyst comprising:

a substrate; and a catalytic coating formed on said substrate, said catalytic coating comprising:

a first grain including a porous carrier which supports thereon at least one first noble metal selected from the group consisting of platinum, palladium, rhodium and iridium; and a second grain including a first double oxide represented by the following general formula (1);

$$(La_{1-x}A_x)_{1-\alpha}BZr_\beta O_\delta \quad (1)$$

where A is at least one element selected from the group consisting of barium, potassium and cesium, B is at least one transition element selected from the group consisting of iron, cobalt, nickel and manganese, x is a number which is greater than 0 and less than 1, $\alpha$ is a number which is greater than 0 and less than 0.2, $\beta$ is a number which is greater than 0 and less than 3, and $\delta$ is a number which is greater than zero.

11. A catalyst according to claim 10, wherein said porous carrier is made of at least one member selected from the group consisting of alumina, a silica alumina and zeolite.

12. A catalyst according to claim 10, wherein said catalytic coating comprises:

a first layer which is formed on the substrate and contains said second grain; and a second layer which is formed on said first layer and contains said first grain.

13. A catalyst according to claim 10, wherein said catalytic coating further comprises a third grain including a second double oxide containing cerium and zirconium.

14. A catalyst according to claim 13, wherein said second double oxide supports thereon at least one second noble metal selected from the group consisting of platinum and palladium.

15. A catalyst according to claim 14, wherein said at least one second noble metal is said palladium.

16. A catalyst according to claim 10, wherein said catalytic coating further comprises a barium compound.

17. A catalyst according to claim 16, wherein said barium compound is barium carbonate.

18. A catalyst according to claim 10, wherein said porous carrier is in an amount of from 50 to 300 g per liter of said substrate.

19. A method of producing a catalyst used for purifying an exhaust gas, said catalyst comprising a substrate and a catalytic coating formed on said substrate, said method comprising the following steps of:

(a) preparing a mixture comprising:

a first powder including a porous carrier which supports thereon at least one first noble metal selected from the group consisting of palladium and rhodium; and a second powder including a first double oxide which supports thereon at least one second noble metal selected from the group consisting of platinum and palladium, said first double oxide being represented by the following general formula (1):

$$(La_{1-x}A_x)_{1-\alpha}BO_\delta \quad (1)$$

where A is at least one element selected from the group consisting of barium, potassium and cesium, B is at least one transition element selected from the group consisting of iron, cobalt, nickel and manganese, x is a number which is greater than 0 and less than 1, $\alpha$ is a number which is greater than 0 and less than 0.2, and $\delta$ is a number which is greater than zero, wherein said first double oxide further comprises zirconium;

(b) preparing a slurry by adding water to said mixture;

(c) applying said slurry to said substrate, such that a precursor of said catalytic coating is formed on said substrate; and (d) baking said precursor into said catalytic coating.

20. A method of producing a catalyst used for purifying an exhaust gas, said catalyst comprising a substrate and a catalytic coating formed on said substrate, said method comprising the following steps of:

(a) preparing a mixture comprising:

a first powder including a porous carrier which supports thereon at least one first noble metal selected from the group consisting of platinum, palladium, rhodium and iridium; and a second powder including a first double oxide represented by the following general formula (1):

$$(La_{1-x}A_2)_{1-\alpha}BZr_\beta O_\delta \quad (1)$$

where A is at least one element selected from the group consisting of barium, potassium and cesium, B is at least one transition element selected from the group consisting of iron, cobalt, nickel and manganese, x is a number which is greater than 0 and less than 1, $\alpha$ is a number which is greater than 0 and less than 0.2, $\beta$ is a number which is greater than 0 and less than 3, and $\delta$ is a number which is greater than zero;

(b) preparing a slurry by adding water to said mixture;

(c) applying said slurry to said substrate, such that a precursor of said catalytic coating is formed on said substrate; and (d) baking said precursor into said catalytic coating.

21. A catalyst for purifying an exhaust gas, said catalyst comprising:

a substrate; and a catalytic coating formed on said substrate, said catalytic coating comprising:

a first grain including a porous carrier which supports thereon at least one first noble metal selected from the group consisting of palladium and rhodium;

a second grain including a first double oxide which supports thereon at least one second noble metal selected from the group consisting of platinum and palladium, said first double oxide being represented by the following general formula (1);

$$(La_{1-x}A_x)_{1-\alpha}BO_\delta \quad (1)$$

where A is at least one element selected from the group consisting of barium, potassium and cesium, B is at least one transition element selected from the group consisting of iron, cobalt, nickel and manganese, x is a number which is greater than 0 and less than 1, $\alpha$ is a number which is greater than 0 and less than 0.2, and $\delta$ is a number which is greater than zero; and a third grain including a second double oxide containing cerium and zirconium.

22. A catalyst according to claim 21, wherein said porous carrier is made of at least one member selected from the group consisting of alumina, a silica-alumina and zeolite.

23. A catalyst according to claim 21, wherein said catalytic coating comprises:

a first layer which is formed on the substrate and contains said second grain; and a second layer which is formed on said first layer and contains said first grain.

24. A catalyst according to claim 21, wherein second double oxide supports thereon at least one third noble metal selected from the group consisting of platinum and palladium.

25. A catalyst according to claim 24, wherein said at least one third noble metal is palladium.

26. A catalyst according to claim 21, wherein said catalytic coating further comprises a barium compound.

27. A catalyst according to claim 26, wherein said barium compound is barium carbonate.

28. A catalyst according to claim 21, wherein said porous carrier in an amount of from 50 to 300 g per liter of said substrate.

29. A method of producing a catalyst used for purifying an exhaust gas, said catalyst comprising a substrate and a catalytic coating formed on said substrate, said method comprising the following steps of:

(a) preparing a mixture comprising:
a first powder including a porous carrier which supports thereon at least one first noble metal selected from the group consisting of palladium and rhodium;
a second powder including a first double oxide which supports thereon at least one second noble metal selected from the group consisting of platinum and palladium, said first double oxide being represented by the following general formula (1):

$$(La_{1-x}A_x)_{1-\alpha}BO_\delta \qquad (1)$$

where A is at least one element selected from the group consisting of barium, potassium and cesium, B is at least one transition element selected from the group consisting of iron, cobalt, nickel and manganese, x is a number which is greater than 0 and less than 0.2, $\beta$ is a number which is greater than 0 and less than 3, and $\delta$ is a number which is greater than zero; and a third grain including a second double oxide comprising cerium and zirconium;

(b) preparing a slurry by adding water to said mixture;

(c) applying said slurry to said substrate, such that a precursor of said catalytic coating is formed on said substrate; and (d) baking said precursor into said catalytic coating.

* * * * *